US012596668B2

(12) United States Patent
Redaelli

(10) Patent No.: US 12,596,668 B2
(45) Date of Patent: Apr. 7, 2026

(54) DUAL INTERFACE HIGH-SPEED MEMORY SUBSYSTEM

(71) Applicant: Micron Technology, Inc., Boise, ID (US)

(72) Inventor: Marco Redaelli, Munich (DE)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/783,335

(22) Filed: Jul. 24, 2024

(65) Prior Publication Data

US 2025/0238391 A1    Jul. 24, 2025

Related U.S. Application Data

(60) Provisional application No. 63/623,337, filed on Jan. 21, 2024.

(51) Int. Cl.
| | |
|---|---|
| *G06F 13/42* | (2006.01) |
| *G06F 9/4401* | (2018.01) |
| *G06F 13/16* | (2006.01) |

(52) U.S. Cl.
CPC ........ *G06F 13/4282* (2013.01); *G06F 9/4401* (2013.01); *G06F 13/16* (2013.01); *G06F 2213/0002* (2013.01)

(58) Field of Classification Search
CPC ......... G06F 2213/0002; G06F 13/4282; G06F 13/16; G06F 9/4401
See application file for complete search history.

(56) References Cited

U.S. PATENT DOCUMENTS

| | | | | |
|---|---|---|---|---|
| 8,943,234 B1 * | 1/2015 | Voorhees | .............. | G06F 3/0671 |
| | | | | 710/17 |
| 10,579,391 B2 * | 3/2020 | Schlanger | ............. | G06F 9/4401 |
| 10,719,246 B2 * | 7/2020 | Lee | ..................... | G06F 12/0815 |
| 2009/0031073 A1 * | 1/2009 | Diggs | ................... | G06F 3/0661 |
| | | | | 711/149 |
| 2009/0094620 A1 * | 4/2009 | Kalwitz | .............. | G06F 11/2089 |
| | | | | 719/325 |
| 2010/0174866 A1 * | 7/2010 | Fujimoto | ............ | G06F 12/0246 |
| | | | | 711/170 |
| 2019/0095271 A1 * | 3/2019 | Lemberg | ................ | G06F 11/073 |
| 2019/0121756 A1 * | 4/2019 | Yang | ................... | G06F 11/1012 |
| 2020/0371695 A1 * | 11/2020 | Gopal | ................... | G06F 3/0658 |
| 2021/0405919 A1 * | 12/2021 | K | .......................... | G06F 3/0671 |
| 2023/0259627 A1 * | 8/2023 | Santan | ................ | G06F 13/1642 |
| | | | | 726/26 |
| 2025/0085977 A1 * | 3/2025 | Krithivas | .............. | G06F 9/4401 |
| 2025/0117205 A1 * | 4/2025 | Minnich | ................ | G06F 8/654 |

OTHER PUBLICATIONS

Texas Instruments, IWR1642 Bootloader Flow Application Report, Jun. 10, 2017 pp. 2-9 (Year: 2017).*

* cited by examiner

*Primary Examiner* — Henry Tsai
*Assistant Examiner* — Christopher A Daley
(74) *Attorney, Agent, or Firm* — NICHOLSON DE VOS WEBSTER & ELLIOTT LLP

(57) ABSTRACT

A memory subsystem that includes a memory device, a first host interface, a serial interface controller that provides host access to a boot partition of the memory device using the first host interface, a second host interface, and a high-speed interface controller that provides host access to a user partition of the memory device using the second host interface.

20 Claims, 5 Drawing Sheets

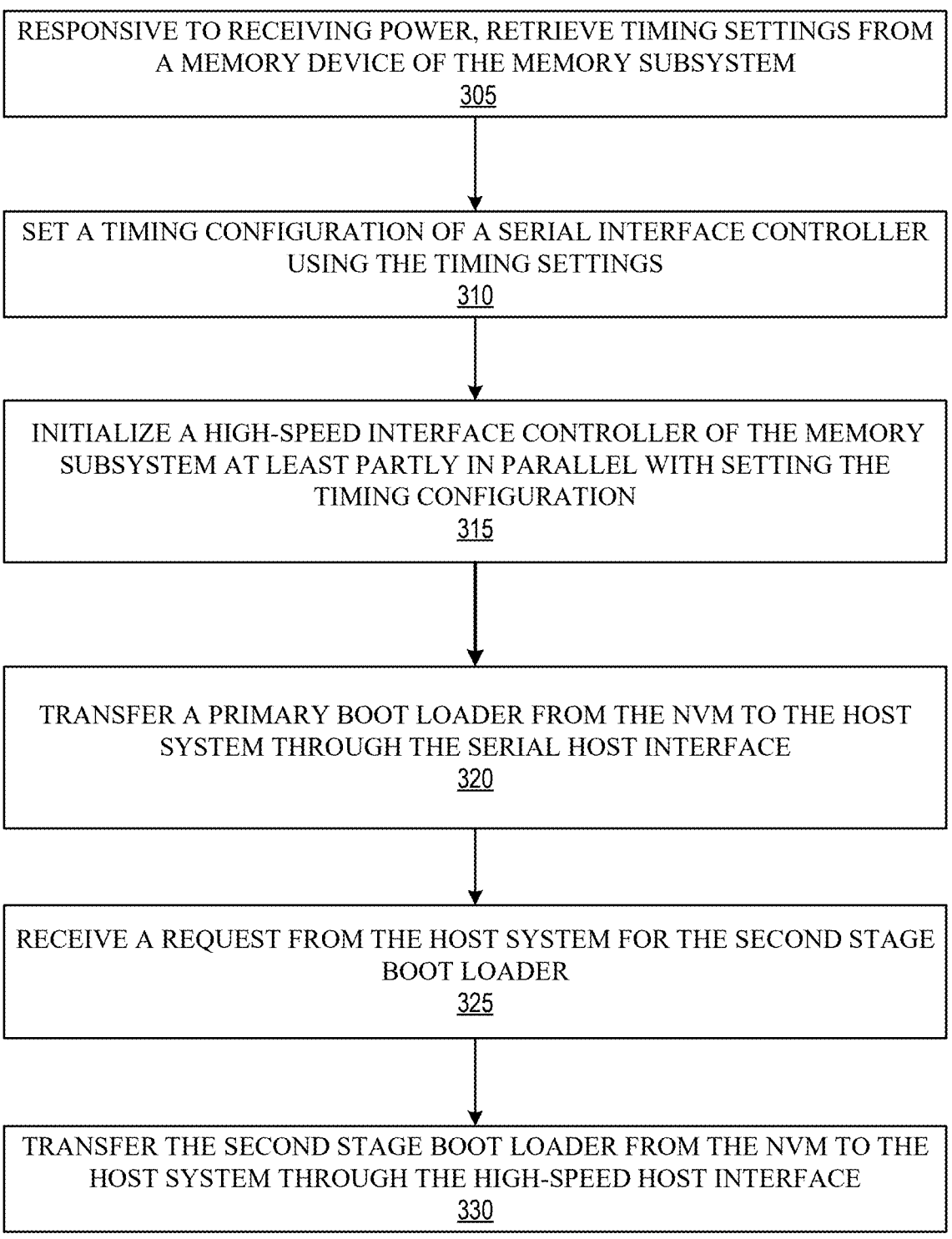

RESPONSIVE TO RECEIVING POWER, RETRIEVE TIMING SETTINGS FROM A MEMORY DEVICE OF THE MEMORY SUBSYSTEM
305

SET A TIMING CONFIGURATION OF A SERIAL INTERFACE CONTROLLER USING THE TIMING SETTINGS
310

INITIALIZE A HIGH-SPEED INTERFACE CONTROLLER OF THE MEMORY SUBSYSTEM AT LEAST PARTLY IN PARALLEL WITH SETTING THE TIMING CONFIGURATION
315

TRANSFER A PRIMARY BOOT LOADER FROM THE NVM TO THE HOST SYSTEM THROUGH THE SERIAL HOST INTERFACE
320

RECEIVE A REQUEST FROM THE HOST SYSTEM FOR THE SECOND STAGE BOOT LOADER
325

TRANSFER THE SECOND STAGE BOOT LOADER FROM THE NVM TO THE HOST SYSTEM THROUGH THE HIGH-SPEED HOST INTERFACE
330

FIG. 4

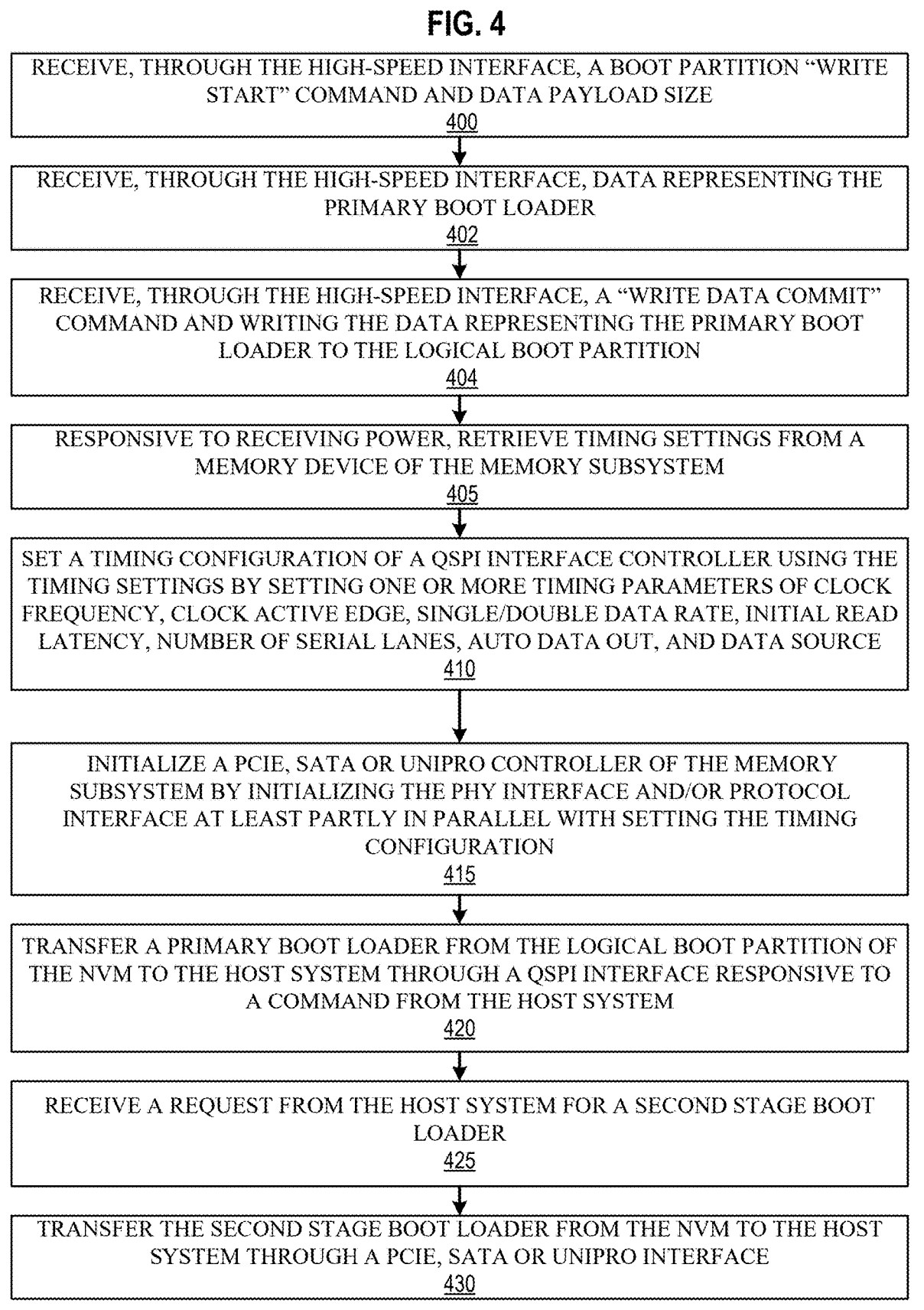

RECEIVE, THROUGH THE HIGH-SPEED INTERFACE, A BOOT PARTITION "WRITE START" COMMAND AND DATA PAYLOAD SIZE
400

RECEIVE, THROUGH THE HIGH-SPEED INTERFACE, DATA REPRESENTING THE PRIMARY BOOT LOADER
402

RECEIVE, THROUGH THE HIGH-SPEED INTERFACE, A "WRITE DATA COMMIT" COMMAND AND WRITING THE DATA REPRESENTING THE PRIMARY BOOT LOADER TO THE LOGICAL BOOT PARTITION
404

RESPONSIVE TO RECEIVING POWER, RETRIEVE TIMING SETTINGS FROM A MEMORY DEVICE OF THE MEMORY SUBSYSTEM
405

SET A TIMING CONFIGURATION OF A QSPI INTERFACE CONTROLLER USING THE TIMING SETTINGS BY SETTING ONE OR MORE TIMING PARAMETERS OF CLOCK FREQUENCY, CLOCK ACTIVE EDGE, SINGLE/DOUBLE DATA RATE, INITIAL READ LATENCY, NUMBER OF SERIAL LANES, AUTO DATA OUT, AND DATA SOURCE
410

INITIALIZE A PCIE, SATA OR UNIPRO CONTROLLER OF THE MEMORY SUBSYSTEM BY INITIALIZING THE PHY INTERFACE AND/OR PROTOCOL INTERFACE AT LEAST PARTLY IN PARALLEL WITH SETTING THE TIMING CONFIGURATION
415

TRANSFER A PRIMARY BOOT LOADER FROM THE LOGICAL BOOT PARTITION OF THE NVM TO THE HOST SYSTEM THROUGH A QSPI INTERFACE RESPONSIVE TO A COMMAND FROM THE HOST SYSTEM
420

RECEIVE A REQUEST FROM THE HOST SYSTEM FOR A SECOND STAGE BOOT LOADER
425

TRANSFER THE SECOND STAGE BOOT LOADER FROM THE NVM TO THE HOST SYSTEM THROUGH A PCIE, SATA OR UNIPRO INTERFACE
430

DUAL INTERFACE HIGH-SPEED MEMORY SUBSYSTEM

CROSS-REFERENCE TO RELATED APPLICATION

The present application claims the benefit of U.S. Provisional Patent Application No. 63/623,337 filed on Jan. 21, 2024, which is incorporated by reference herein in its entirety.

TECHNICAL FIELD

The present disclosure generally relates to a memory subsystem, and more specifically, relates to a dual interface high-speed memory subsystem.

BACKGROUND ART

A memory subsystem can include one or more memory devices that store data. The memory devices can be, for example, non-volatile memory (NVM) devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to boot an embedded computing system including a memory subsystem in accordance with some embodiments of the present disclosure.

FIG. 4 is a flow diagram of another example method to boot an embedded computing system including a memory subsystem in accordance with some embodiments of the present disclosure.

DETAILED DESCRIPTION

Figure 1:
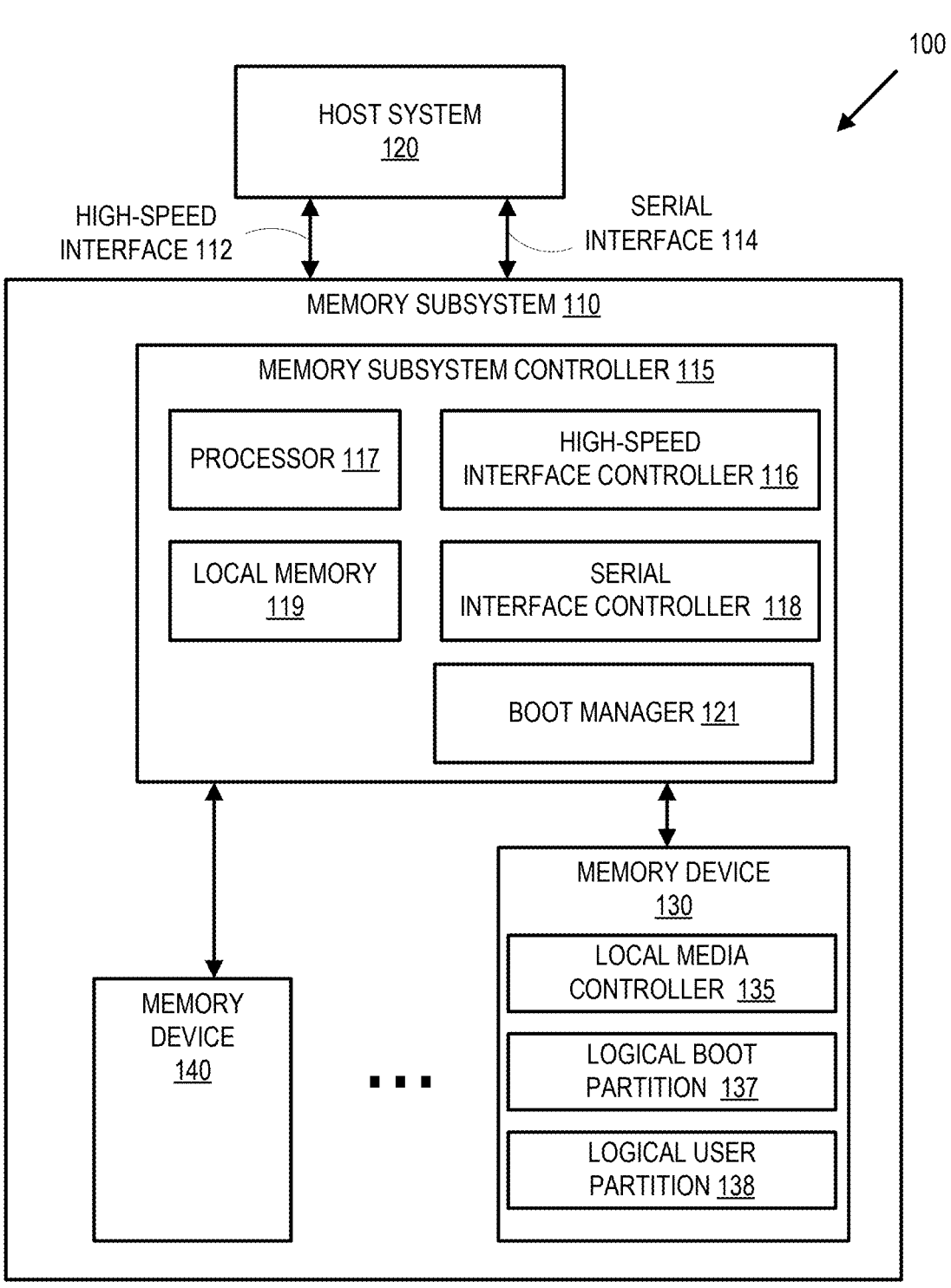
FIG. 1 illustrates an example computing system that includes a memory subsystem in accordance with some embodiments of the present disclosure.

Aspects of the present disclosure are directed to a dual interface memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

NVM memory subsystems are commonly used in embedded computing systems, such as those used in Systems-on-a-Chip (SOC), in industrial applications, and in the automotive industry. An NVM memory subsystem typically provides read and write access to the NVM via a peripheral device communication interface, such as a Peripheral Component Interconnect Express (PCIe) interface, Serial Advanced Technology Attachment (SATA) interface, or another high-speed interface. These communication interfaces are used to transfer data between the NVM and a processor or controller of the embedded computing system and, more generally, between the memory subsystem and a host system.

Booting an embedded computing system involves executing boot code (also called a "boot loader") persistently stored in non-volatile memory. A multi-stage boot process involves executing at least a primary boot loader, such as a BIOS, as well as a second stage boot loader, such as a kernel. In some embedded systems that include an NVM memory subsystem, the second stage boot loader typically resides in the primary storage device of the memory subsystem while the primary boot loader often resides in a separate dedicated memory component such as a small capacity serial NOR (S-NOR) flash memory that is part of the embedded computing system but external to the memory subsystem. Such is the case, e.g., in conventional solid state drive (SSD) memory subsystems. The embedded system controller uses a serial interface (commonly a Serial Peripheral Interface (SPI) or variant thereof) to access the S-NOR component and execute the BIOS or primary boot loader to perform basic initialization of some hardware and operating system components, including initializing a high-speed interface between the SSD and the embedded system controller. Once the high-speed interface is initialized, the BIOS or primary boot loader transfers the kernel or second stage boot loader from the SSD's primary storage device to the embedded system controller through the high-speed interface. The embedded system controller then executes the kernel or second stage boot loader to finish the boot process.

It should be noted that embedded computing systems with SSD memory subsystems are currently not able to boot directly from the SSD. Booting from S-NOR is an artifact inherited from personal computer architecture. This enabled computers to be reconfigured, e.g., allow for a hardware change without the need to modify the operating system image. SOC products, however, are typically not upgradable/configurable like a personal computer. As a result, this flexibility is unnecessary, these embedded systems take longer to boot than necessary, and can be costlier to manufacturer due to the additional S-NOR component that must be included in these systems.

Aspects of the present disclosure address the above and other deficiencies by providing an NVM memory subsystem in which the NVM is logically divided into a boot partition and a user partition. The boot partition contains the primary boot loader. The second stage boot loader may reside in either the boot partition or the user partition. To access the boot partition, and hence the primary boot loader, the memory subsystem includes a serial interface in addition to the high-speed interface. The serial interface provides quick access to the NVM before the high-speed interface is finished initializing (e.g., after the first stage of the boot process). The serial interface facilitates transferring the primary boot loader from the NVM to the host, enabling the host system to boot directly from the NVM of the NVM memory subsystem and obviating the need for a separate S-NOR component, thereby saving manufacturing costs as well as achieving faster boot times relative to embedded computing systems with memory subsystems that contain a separate S-NOR component in addition to the NVM.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such. The one or more memory devices 130 may be logically separated into different partitions including a logical boot partition 137 and a logical user partition 138.

A memory subsystem 110 can be a storage device, a memory module, or a hybrid of a storage device and memory module. In exemplary embodiments, the storage device is an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. In exemplary embodiments described below, computing system 100 is an embedded computing system.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc. Memory subsystem 110 can be, e.g., an SSD, eMMC, UFS, or another type of NVM memory subsystem. In an exemplary embodiment, memory subsystem 110 is an SSD memory subsystem.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). Examples of processor chipsets include a Platform Controller Hub (PCH) (also called ICH/PCH). The host system 120 uses the memory subsystem 110, for example, to write data to the memory subsystem 110 and read data from the memory subsystem 110.

The memory subsystem 110 is coupled to the host system 120 via a high-speed interface 112 for transferring data (including control, address, data, and other signals) between the host system 120 and the memory subsystem 110. Examples of high-speed interfaces include, but are not limited to, PCIe, SATA, and Unified Protocol (UniPro). The memory subsystem controller 115 also includes high-speed interface controller 116 that provides the host system 120 access to the logical user partition 138 through the high-speed host interface 112. In exemplary embodiments, the serial interface controller 118 is a Quad SPI (QSPI) controller.

The memory subsystem 110 is also coupled to the host system 120 via a serial interface 114 for transferring data (including control, address, data, and other signals) between the host system 120 and the memory subsystem 110. Examples of serial interfaces include SPI and variations thereof, such as QSPI. The memory subsystem 110 includes a serial interface controller 118 that provides the host system 120 access to the logical boot partition 137 via the serial host interface 114. In exemplary embodiments, the serial interface controller 118 is a QSPI controller.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a boot manager 121 that can initialize the serial and high-speed interface controllers during the boot process. In some embodiments, the controller 115 includes at least a portion of the boot manager 121. For example, the controller 115 can include a processor 117 (processing device) configured to execute instructions stored in local memory 119 for performing the operations described herein. In some embodiments, the boot manager 121 is part of the host system 120, an application, or an operating system. Further details with regards to the operations of the boot manager 121 are described below.

Figure 2:
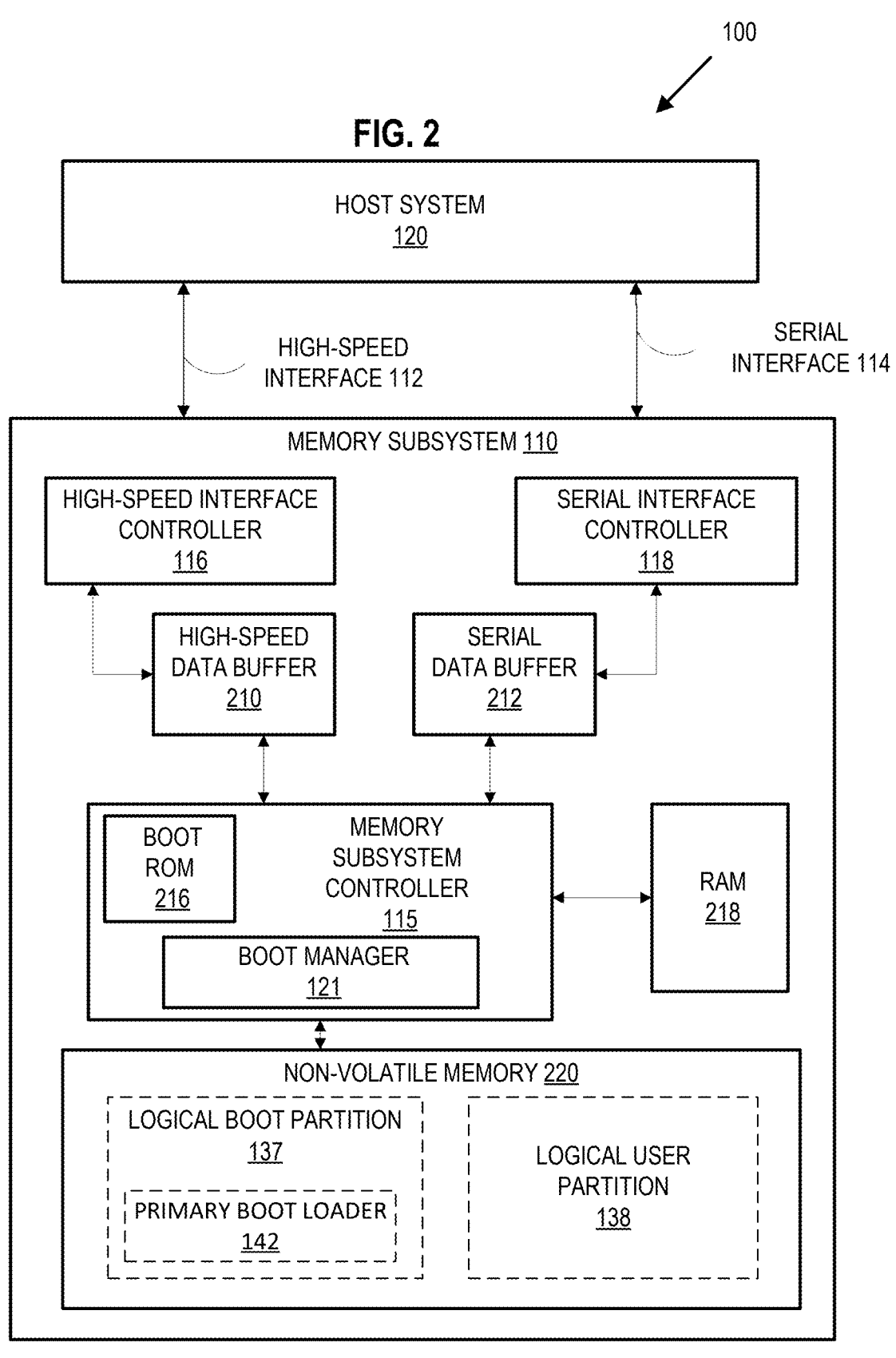
FIG. 2 illustrates a more detailed example of the computing system that includes a memory subsystem in accordance with some embodiments of the present disclosure.

FIG. 2 is a block diagram of an example computing system 100 shown in more detail, according to some embodiments. In some embodiments, the memory subsystem 110 includes a high-speed data buffer 210 coupled to each of the high-speed interface controller 116 and the memory subsystem controller 115. The high-speed data buffer 210 temporarily stores data passing between the high-speed interface controller 116 and the memory subsystem controller 115. In some embodiments, the memory subsystem 110 includes a serial data buffer 212 coupled to each of the serial interface controller 118 and the memory subsystem controller 115. The serial data buffer 212 temporarily stores data passing between the serial interface controller 118 and the memory subsystem controller 115. In some embodiments, data transferred between the host system 120 and the memory subsystem 110 may be sent along an optimized path that includes one of the high-speed data buffer 210 and the serial data buffer 212, while commands from the host system 120 to memory subsystem 110 may be sent to the memory subsystem controller 115 without passing through either the high-speed data buffer 210 or the serial data buffer 212.

In some embodiments, the memory subsystem 110 includes a boot ROM 216 integrated into the memory subsystem controller 115. The boot ROM 216 stores code that is executed by the memory subsystem controller 115 and that initializes the memory subsystem 110. In some embodiments, the memory subsystem 110 also includes a RAM 218 coupled to the memory subsystem controller 115. For example, the RAM 218 can include one or more of the memory devices 140.

In some embodiments, the memory subsystem 110 includes NVM 220. For example, the NVM 220 can include one or more of the memory devices 130. In exemplary embodiments, the NVM 220 is NAND flash memory device. A primary boot loader 142 is stored in the logical boot partition 137 of the NVM 220.

An example multi-stage boot process will now be described with reference to FIG. 2. The multi-stage boot process includes a primary boot loader (e.g. a BIOS, etc.) and a second stage boot loader (e.g. a kernel). Power is applied to the computing system 100 causing the memory subsystem controller 115 to execute code in ROM 216 that loads memory subsystem firmware code from an unmapped area of NVM 220 into the RAM 218. The memory subsystem firmware code includes boot manager 121. Memory subsystem controller 115 executes the memory subsystem firmware code, causing boot manager 121 to initialize memory subsystem hardware and peripherals including the serial interface 114. Initializing the serial interface 114 may include reading timing settings (i.e. timing parameters and associated values) from NVM 220 and setting a timing configuration of the serial interface controller 118 using the timing settings. Boot manager 121 also initializes the high-speed interface controller 116 in parallel with setting the timing configuration of the serial interface controller 118.

While the high-speed interface controller 116 is being initialized (or prior to its initialization), the serial interface controller 118 completes initialization and the serial interface 114 becomes available to transfer data between the memory subsystem 110 and the host system 120. A controller of the host system 120 sends, along the serial interface 114, a command to retrieve the primary boot loader 142. The memory subsystem controller 115 interprets the command, retrieves the primary boot loader 142 from the logical boot partition 137, and sends the primary boot loader 142 to the host system 120 through the serial interface 114.

The host system 120 executes the primary boot loader 142. For example, the primary boot loader 142 performs initialization of hardware (e.g. peripheral devices) and protocols and loads the second stage boot loader or operating system kernel by passing a command to the memory subsystem 110 along the initialized high-speed interface 112. The memory subsystem controller 115 interprets the command, retrieves the second stage boot loader or operating system kernel from the logical user partition 138 of NVM 220, and sends the second stage boot loader or operating system kernel to the host system 120 along the high-speed interface 112. The host system 120 controller executes the second stage boot loader or operating system kernel to finish the boot process.

While the above describes an exemplary boot process, it should be understood that many different variations are also possible within the scope of the present disclosure. For example, instead of the memory subsystem controller 115 waiting for a command from the host system 120 to retrieve the primary boot loader 142, the memory subsystem controller 115 may send the primary boot loader 142 to the host system 120 without waiting for a command (e.g., in response to completing initialization of the serial interface 114). As another example, the second stage boot loader or operating system kernel can in some cases reside in the logical user partition 138 instead of in the logical boot partition 137.

In some exemplary embodiments, the computing system 100 is a SOC, the host system 120 is a controller of the SOC, the high-speed host interface 112 is PCIe, and the serial host interface 114 is QSPI. The QSPI interface is quicker to initialize than the PCIe interface but transfers data at a slower rate than the PCIe interface. Therefore, the QSPI interface is used to transfer out (i.e. to the host system 120 controller) the relatively small primary boot loader with less delay following the application of power (compared to the PCIe interface) while the PCIe interface transfers out the larger second stage boot loader.

In some embodiments, the QSPI interface can be a simplified version of QSPI that supports a reduced number of features, namely, boot code programming and update, interface timing and waveforms, and boot timing configuration. Initializing the QSPI interface may include reading timing parameters from NVM 220 and setting the timing parameters in the serial interface controller 118.

FIG. 3 is a flow diagram of an example method to boot an embedded computing system including SSD memory subsystem showing operations performed by the memory subsystem in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the memory subsystem controller 115 (e.g. using boot manager 121) of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the memory subsystem controller 115 receives power and, responsive thereto, retrieves timing settings from the NVM 220. More particularly, the memory subsystem controller 115 executes code stored in the boot ROM 216 that causes memory subsystem firmware to be loaded into the RAM 218. The memory subsystem controller 115 then executes the firmware causing the memory subsystem controller 115 to retrieve the timing settings from an unmapped area of NVM 220.

At operation 310, the memory subsystem controller 115 sets a timing configuration of the serial interface controller 118 using the retrieved timing settings. Setting the timing configuration includes setting one or more timing parameters. In some examples the timing parameters than can be set are, e.g., Clock Frequency, Clock Active Edge (Rising or Falling), Single Data Rate (SDR) or Double Data Rate (DDR), Initial Read Latency, Number of Serial Lanes (one, two, or four), Auto Data Out (Yes or No), Data Source (Boot Partition or User Partition). The timing configuration of the serial interface controller 118 is set by writing the timing parameter values into the registers of the serial interface controller 118. The retrieved timing settings includes the parameter values to set.

At operation 315, the memory subsystem controller 115 initializes the high-speed interface controller 116 at least partly in parallel with setting the timing configuration of the serial interface controller 118. Initializing the high-speed interface controller 116 includes, e.g. initializing the PHY interface (e.g. using the PHY Init command to write to the high-speed interface controller's 116 Base Address Registers (BAR)) and/or initializing the high-speed interface controller's 116 protocol interface (e.g. using Protocol Init commands).

At operation 320, the memory subsystem controller 115 transfers the primary boot loader 142 from the NVM 220 to the host system 120 through the serial host interface 114. In some embodiments, the primary boot loader 142 is transferred from the logical boot partition 137 of the NVM 220. In some embodiments, the memory subsystem controller 115 transfers the primary boot loader 142 to the host system 120 responsive to a command received from the host system 120. The memory subsystem controller 115 transfers the primary boot loader 142 through the serial interface before the high-speed interface is initialized and available for transferring data from the memory device. The host system

120 executes the primary boot loader 142, causing the discovery and initialization of hardware components connected to the host system 120 (e.g. peripheral devices).

At operation 325, the memory subsystem controller 115 receives a request from the host system 120 for the second stage boot loader, e.g. responsive to the host system 120 executing the primary boot loader 142 which includes a call to execute the second stage boot loader.

At operation 330, responsive to the request from the host system 120, the memory subsystem controller 115 transfers the second stage boot loader 142 from the NVM 220 (i.e. either the logical boot partition 137 or the logical user partition 138) to the host system 120 through the high-speed interface 112.

FIG. 4 is a flow diagram of another example method to boot an embedded computing system including a memory subsystem showing operations performed by the memory subsystem in accordance with some embodiments of the present disclosure.

At operation 400, the memory subsystem controller 115 receives, through the high-speed interface 112, a Boot Partition "Write Start" command including a data payload size as a parameter for the command. For example, a memory subsystem receives from the host system (of the embedded computing system) a command to initiate the programming of or an update to a primary boot loader.

At operation 402, memory subsystem controller 115 receives, through the high-speed interface 112, data representing the primary boot loader.

At operation 404, memory subsystem controller receives, through the high-speed interface 112, a "Write Data Commit" command and writes the data representing the primary boot loader to the logical boot partition 137 of the NVM 220.

Operations 400-402 can be repeated for the second stage boot loader except that SSD memory subsystem controller receives either a Boot Partition "Write Start" command (if the second stage boot loader is to be stored in the logical boot partition) or a User Partition "Write Start" command (if the second stage boot loader is to be stored in the logical user partition) and the data that is transferred represents the second stage boot loader.

At operation 405, the memory subsystem controller 115 receives power and, responsive thereto, retrieves timing settings from the NVM 220. For example, the memory subsystem controller 115 loads and executes memory subsystem firmware as described with reference to operation 305 above.

At operation 410, the memory subsystem controller 115 sets a timing configuration of a QSPI interface controller using the retrieved timing settings. For example, the memory subsystem controller 115 sets one or more timing parameters as described with reference to operation 310 above.

At operation 415, the memory subsystem controller 115 initializes a PCIe, SATA or UniPro interface controller at least partly in parallel with setting the timing configuration of the QSPI controller. Initializing the PCIe, SATA or UniPro controller includes, for example, initializing the PHY interface and/or the protocol interface as described with reference to operation 315 above.

At operation 420, the memory subsystem controller 115 transfers a primary boot loader 142 from the logical boot partition 137 of the NVM 220 to the host system 120 through the QSPI interface 114 responsive to a command received from the host system 120.

At operation 425, the memory subsystem controller 115 receives a request from the host system 120 for a second stage boot loader, e.g. responsive to the host system 120 executing the primary boot loader 142 which includes a call to execute the second stage boot loader.

At operation 430, responsive to the request from the host system 120, the memory subsystem controller 115 transfers the second stage boot loader 142 from the NVM 220 (i.e. either the logical boot partition 137 or the logical user partition 138) to the host system 120 through the PCIe, SATA or UniPro interface.

Figure 5:
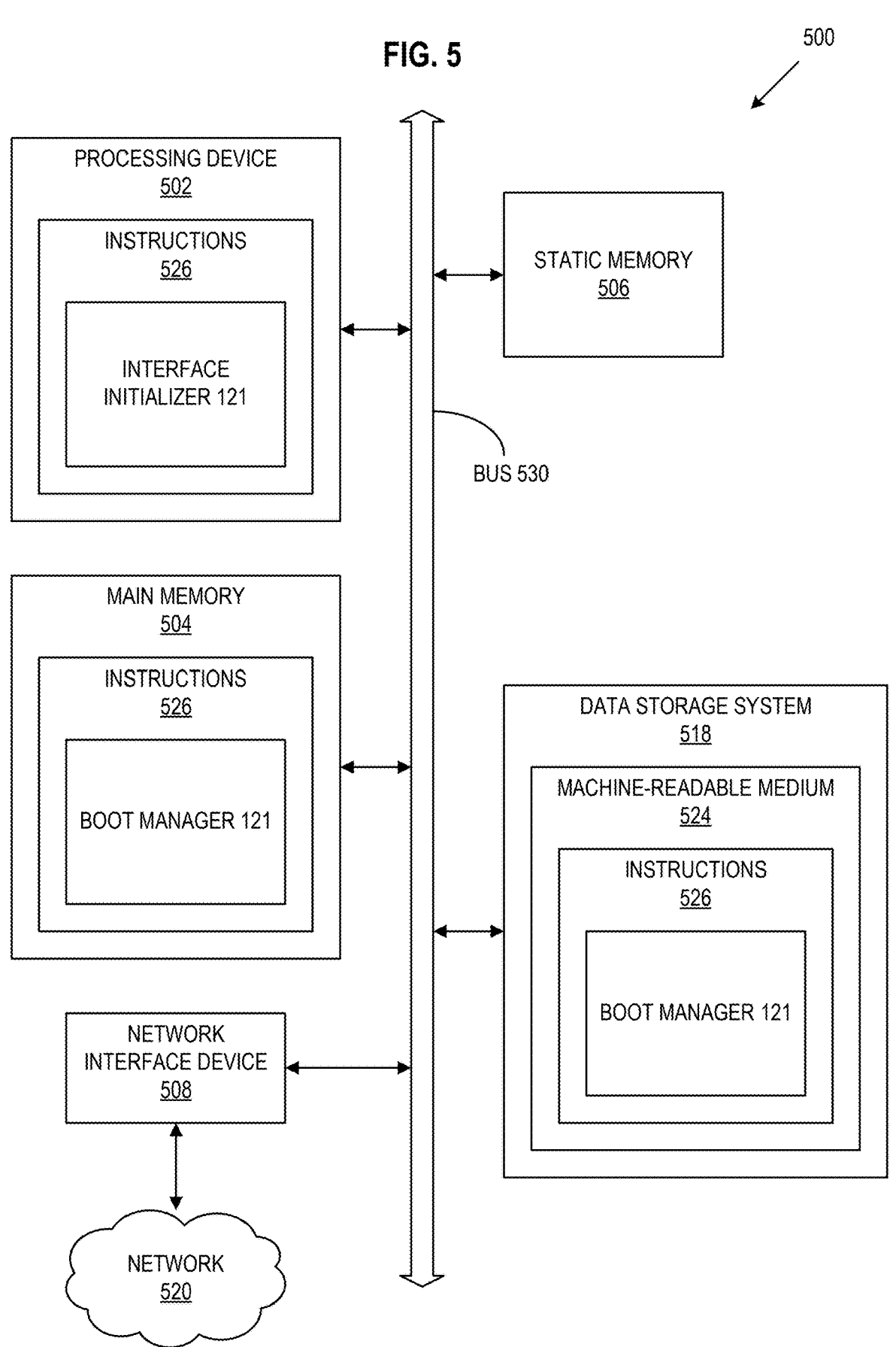
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the boot manager 121 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to boot manager 121 (e.g., the boot manager 121 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the memory subsystem controller 115, may carry out the computer-implemented methods shown in FIGS. 3-4 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory subsystem comprising:
   a non-volatile memory device including a boot partition and a user partition;
   a first host interface connecting the memory subsystem to a host;
   a serial interface controller providing the host access to the boot partition using the first host interface;
   a second host interface connecting the memory subsystem to the same host; and
   a high-speed interface controller providing the host access to the user partition using the second host interface.

2. The memory subsystem of claim 1, wherein the first host interface is a Quad Serial Peripheral Interface (QSPI) interface.

3. The memory subsystem of claim 1, wherein the second host interface is one of a Peripheral Component Interconnect Express (PCIe), Serial Advanced Technology Attachment (SATA), and Unified Protocol (UniPro) interface.

4. The memory subsystem of claim 1, wherein the memory device includes timing settings and firmware code that sets a timing configuration of the serial interface controller using the timing settings.

5. The memory subsystem of claim 4, wherein the firmware code further initializes the high-speed interface controller.

6. The memory subsystem of claim 1, wherein the boot partition includes a primary boot loader that is transferred to a host system through the serial interface.

7. The memory subsystem of claim 6, wherein the memory device includes a second stage boot loader that is transferred to the host system through the high-speed interface controller.

8. The memory subsystem of claim 7, wherein the second stage boot loader is transferred to the host system responsive to a request from the host system.

9. The memory subsystem of claim 7, wherein the serial interface controller and the high-speed interface controller are initialized at least partly in parallel when power is applied to the memory subsystem.

10. The memory subsystem of claim 9, wherein upon receiving power, the memory subsystem transfers the primary boot loader from the boot partition memory to the host system along the first host interface before the second host interface is initialized and available for transferring data from the memory device.

11. A computing system comprising:

a controller; and a non-volatile memory subsystem coupled to the controller through a first interface that is a serial interface and coupled to the same controller through a second interface that is a high-speed interface, the memory subsystem comprising:

a memory device including a boot partition and a user partition, a serial interface controller that transfers data from the boot partition to the controller using the serial interface, and a high-speed interface controller that transfers data from the memory device to the controller using the high-speed interface.

12. The computing system of claim 11, wherein the serial interface is a Quad Serial Peripheral Interface (QSPI) interface.

13. The computing system of claim 11, wherein the high-speed interface is one of a Peripheral Component Interconnect Express (PCIe), Serial Advanced Technology Attachment (SATA), and Unified Protocol (UniPro) interface.

14. The computing system of claim 11, wherein the memory device includes timing settings and firmware code that sets a timing configuration of the serial interface controller using the timing settings.

15. The computing system of claim 14, wherein the firmware code initializes the high-speed interface controller.

16. The computing system of claim 11, wherein the memory subsystem transfers a primary boot loader from the boot partition to the controller using the serial interface.

17. The computing system of claim 11, wherein the memory subsystem transfers a second stage boot loader from the memory device to the controller using the high-speed interface.

18. The computing system of claim 17, wherein the memory subsystem transfers the second stage boot loader responsive to receiving a request from the controller for the second stage boot loader.

19. The computing system of claim 11, wherein upon receiving power, the memory subsystem transfers a primary boot loader from the boot partition to the controller along the serial interface before the high-speed interface is initialized and available for transferring data from the memory device to the controller.

20. The computing system of claim 11, wherein upon receiving power, the memory subsystem initializes the serial interface controller, initializes the high-speed interface controller, transfers a primary boot loader from the boot partition to the controller along the serial interface before the high-speed interface controller is finished initializing, and when high-speed interface controller is finished initializing transfers a second stage boot loader from the memory device to the controller along the high-speed interface.

* * * * *